3,484,369
APPARATUS FOR HEMODIALYSIS OR ARTIFICIAL KIDNEY
Gilbert Desire De Dobbeleer, Leuven, Heverlee, Belgium, assignor, by mesne assignments, to Baxter Laboratories, Inc., a corporation of Delaware
Filed July 6, 1966, Ser. No. 563,114
Claims priority, application Belgium, July 9, 1965, 666,658
Int. Cl. B01d 13/00
U.S. Cl. 210—22                              11 Claims

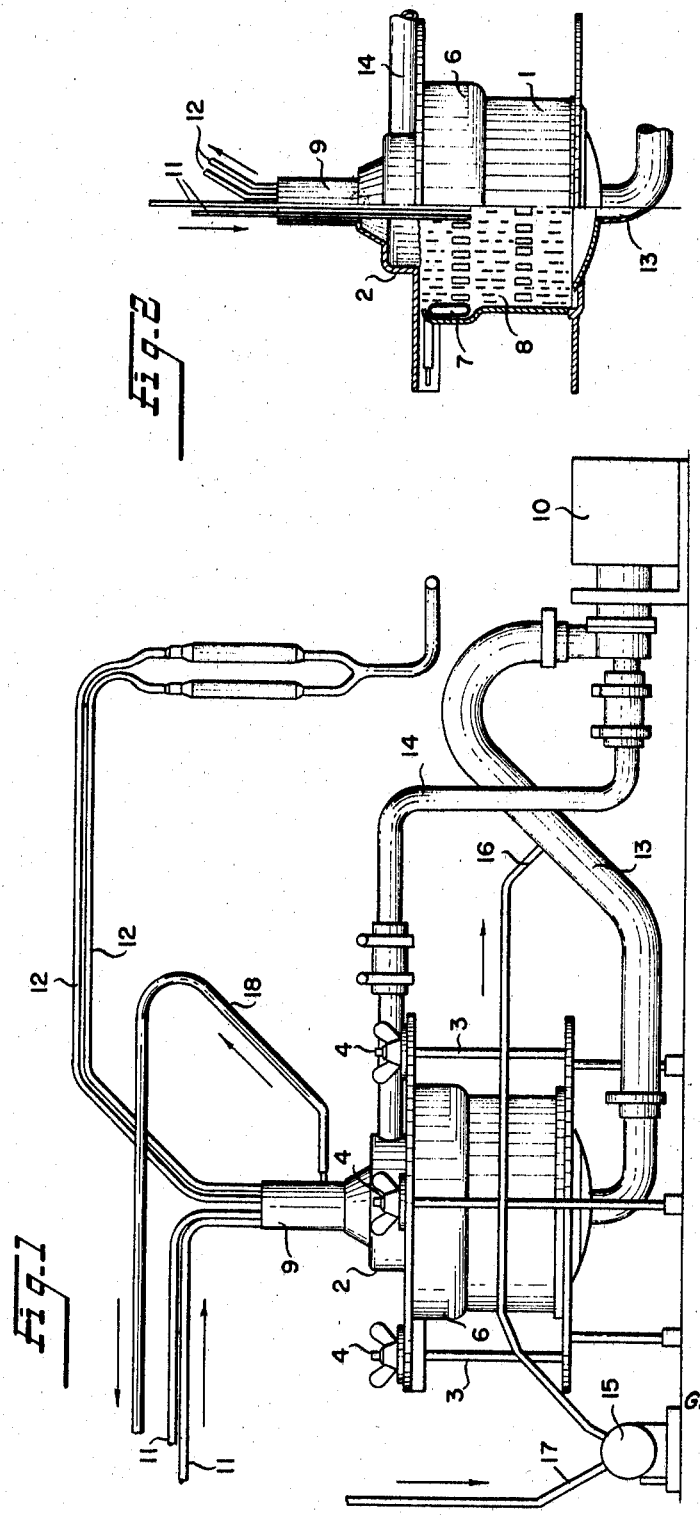

ABSTRACT OF THE DISCLOSURE

Fresh dialysing solution is added to a recirculating system for an artificial kidney and the like while a volume of circulating fluid corresponding to the added solution is removed from the system to maintain a desired diffusion gradient across the diffusion membrane of the apparatus.

---

The present invention relates to apparatus for hemodialysis or an artificial kidney.

Artificial kidneys have already been developed, and the main principle of them being that the blood of the patient is dialyzed against a dialysis liquid through a membrane having a very large surface area. One of the most commonly used apparatuses of this type is a known kidney using cellophane membranes, which are commercially obtainable in sterile packing and are only used once, thus offering considerable advantages.

On the other hand, there are also drawbacks to said known kidney, as indeed to the other apparatuses developed hitherto. The dialysis liquid is passed over the dialysis filter at high speed from a large-capacity receptacle (usually 100 litres) and then back again to the receptacle. This means that the dialysis liquid constantly circulates in a sealed circuit, without replenishment, so that the dialysis efficiency gradually diminishes with the action of the apparatus, since the diffusion gradient of the substances to be eliminated progressively falls off. For this reason the dialysis process has to be interrupted several times, usually three times, in order to renew the entire contents of the receptacle, thus involving an extremely unpleasant and time-consuming additional operation.

Furthermore, the apparatuses developed hitherto are very bulky, in view of the fact that the dialysis equipment and the liquid receptacle both form one integral unit.

The ideal solution to this problem would be to pass the dialysis liquid over the dialysis unit only once, but this has so far proved impossible due to the high input of dialysis liquid required in order to ensure adequate contact between the blood and the dialysis liquid, so that this would necessitate an excessively large and therefore impracticable apparatus.

The subject of the present invention is a hemodialysis apparatus which does not have the above disadvantages. It is small in size and therefore easy to use. The dialysis process does not have to be interrupted and the efficiency of the dialysis remains constant, since fresh dialysis liquid always circulates over the membrane.

The advantages of this improved apparatus lie in the fact that the capacity of the receptacle is extremely small (about two litres) and the dialysis liquid is pumped through at great velocity and input (about thirty litres a minute). Furthermore, a second pump constantly pumps fresh dialysis solution throughout the entire dialysis process from a central storage tank, located some distance away, and passes it under pressure into the dialysis liquid just before it enters the dialysis unit, while the dialysis liquid outlet pipe above and downstream of the dialysis apparatus is fitted with a diverting or drain pipe through which the excess dialysis liquid is removed from the circuit.

The input of the pump for passing fresh dialysis solution into the circuit is adjustable, so that the amount fed in can be altered to give the required dialysis efficiency depending on the circumstances.

The apparatus which forms the subject of the present invention is described below, reference being made to the appended diagram, containing a sketch of design specimen in which:

FIGURE 1 represents an elevation view of the hemodialysis apparatus forming the subject of the invention;

FIGURE 2 is an enlarged view, with partial cross-section of the receptacle containing the dialysis unit.

This improved hemodialysis apparatus or artificial kidney consists of an independently movable small receptacle 1 with a watertight cover 2 held in place by rods 3 and screws 4. The upper edge of receptacle 1 is provided with a lip 6 to hold an inflatable rubber joint 7 to ensure a firmer grip on the dialysis unit 8 in the receptacle. The top part of the lid 2 contains a stack 9 with an upwards-facing aperture. The receptacle 1 holds a fairly small quantity of dialysis liquid (about two litres), which is circulated at a very high velocity and through-flow (about thirty litres a minute) over the dialysis unit by means of a circulating pump 10.

The blood coming from the patient's artery undergoes the necessary treatment (blood pump, mixing with chemical substances, etc.) and is then fed into the receptacle 1 via the inlet pipes 11, and the aperture in stack 9, where it flows through the dialysis unit 8, which is itself sprayed with the dialysis liquid, and then emerges again via the same stack 9, after which, again after the necessary treatment (filtration), it can be sent back to the patient through outlet pipes 12, 12.

The circulating pump 10 passes the dialysis liquid present in receptacle 1 through the inlet pipe 13 mounted underneath the receptacle 1 and through the dialysis unit 8, pumping the dialysis liquid back again from the receptacle 1 through the outlet pipe 14 fitted on the top of the receptacle 1.

Fresh dialysis solution is fed into the closed circuit by means of a second pump 15 along the branch pipe 16 connected to the inlet pipe 13 upstream of the receptacle 1. This fresh solution comes from a central storage tank, located some distance away, via a feed-pipe 17 and can be passed in at any velocity required.

The continuous and regular addition of fresh dialysis solution to the receptacle 1 via the closed circuit causes the liquid level in the stack 9 to rise. The excess dialysis liquid in the closed circuit is regularly drawn off by the water-jet pump along the diverting or drain pipe 18 mounted in the stack 9 and then removed from the circuit.

The advantages of the hemodialysis apparatus of this invention are considerable. Because of the high output of the circulating pump 10 optimum contact between the dialysis liquid and the blood is ensured at all times. In addition, by means of the branch pipe 16, the dialysis liquid is constantly replenished with fresh solution, ensuring an optimum diffusion gradient between the blood and the dialysis tank and hence an increased and constant dialysis efficiency.

Due to the small dimensions of the apparatus and its accessories, more space is available around the patient for treatment and medical supervision and also for the positioning of the receptacle.

Until now it has not been possible to connect several patients to one and the same tank. By means of the hemodialysis apparatus of this invention, and by virtue of its adjustability and adaptability, several apparatuses can be connected up simultaneously to one and the same central storage tank, located some distance away, so that several patients can receive treatment at the same time.

Mention should be made of the fact that the hemodialysis apparatuses developed hitherto have all been very expensive, while the apparatus of this invention is much less costly, which would be a contributory factor in promoting its use.

The apparatus concerned is, of course, not limited to the design as outlined above and can be modified without departing from the spirit or scope of this novel concept as defined by the following claims.

What is claimed is:

1. Hemodialysis apparatus or artificial kidney comprising a watertight receptacle having an inlet and an outlet communicatively connected together in a circuit and containing a membrane dialysis unit through which both blood and dialysis liquid are circulated, a first pump connected in said circuit to said inlet for repeatedly circulating dialysis liquid through said container about said unit a second pump connected in fluid communication with said inlet for constantly pumping fresh dialysis solution from a remote central storage tank into the circulating dialysis liquid and a diverting pipe connected to said receptacle downstream of said unit and through which the excess dialysis liquid is removed from the circuit.

2. Hemodialysis apparatus or artificial kindey according to claim 1, wherein the second pump is adjustable, for alterning the amount of fresh solution fed into the circuit.

3. In a process for hemodialysis in which blood is passed and a dialysing fluid repeatedly circulated through a membrane dialyser unit, the steps of:
    feeding fresh dialysing solution into the circulating dialysing fluid, and removing a portion of the circulating fluid corresponding to the fresh solution fed into circulation.

4. A combination according to claim 3 in which the step of feeding fresh dialysis solution is continuous while said fluid is circulating.

5. A combination according to claim 3 characterized in that the fresh solution is fed into circulation at a level below the position of fluid removal from circulation.

6. A combination according to claim 3 characterized by the step of adjusting the rate of feeding fresh solution into circulation.

7. In an artificial kidney and the like of the type having a circuit in which a dialysing fluid is pumped for repeated fluid circulation through a membrane dialysis unit, a combination comprising:
    means for pumping fresh dialysis solution into said circuit, and
    means for diverting a portion of the circulating fluid from said circuit corresponding to fresh solution entering circulation.

8. Apparatus according to claim 7 in which the diverting means is a pipe connected to said circuit downstream of said unit.

9. Apparatus according to claim 7 in which the pumping means is adjustable for varying the volume of fresh solution entering circulation.

10. Apparatus according to claim 7 in which the container has an inlet, and the pumping means comprises:
    a pump, and
    a pipe connected to said pump for feeding fresh solution into said inlet.

11. Apparatus according to claim 10, in which the pump is arranged for feeding fresh solution continuously while the dialysing fluid is being circulated.

References Cited

UNITED STATES PATENTS

| | | | |
|---|---|---|---|
| 2,720,879 | 10/1955 | Gascd et al. | 23—258.5 |
| 2,969,150 | 1/1961 | Broman | 210—321 |
| 3,212,642 | 10/1965 | Klystra | 210—321 |
| 3,370,710 | 2/1968 | Bluemle | 210—321 |

MORRIS O. WOLK, Primary Examiner

S. MARANTZ, Assistant Examiner

U.S. Cl. X.R.

128—214; 210—321

Disclaimer and Dedication 3,484,369.—*Gilbert Desire De Dobbeleer*, Leuven, Heverlee, Belgium. AP-
PARATUS FOR HEMODIALYSIS OR ARTIFICIAL KIDNEY.
Patent dated Dec. 16, 1969. Disclaimer and dedication filed Aug. 26,
1971, by the assignee, *Baxter Laboratories, Inc.*

Hereby disclaims and dedicates to the Public the remaining term of all claims of said patent.

[*Official Gazette October 26, 1971.*]